Aug. 20, 1935.　　　A. H. DAVIS, JR　　　2,011,710
APPARATUS FOR MEASURING TEMPERATURE
Filed Aug. 18, 1928　　2 Sheets—Sheet 1
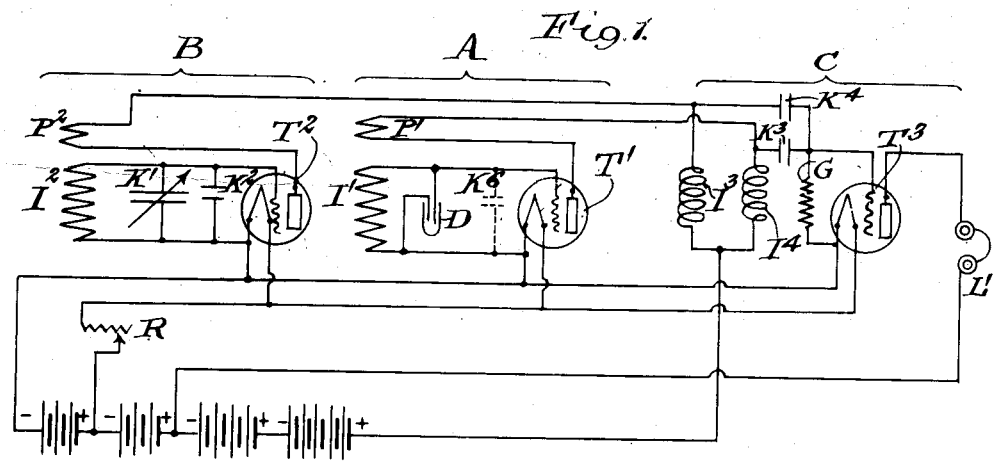
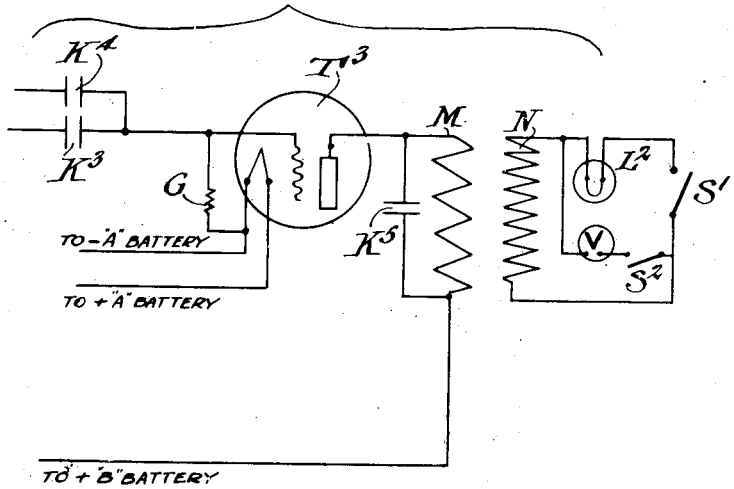
Inventor
Archibald H. Davis Jr.
by Forbes Silsby
Attorney Aug. 20, 1935.　　　A. H. DAVIS, JR　　　2,011,710
APPARATUS FOR MEASURING TEMPERATURE
Filed Aug. 18, 1928　　2 Sheets-Sheet 2
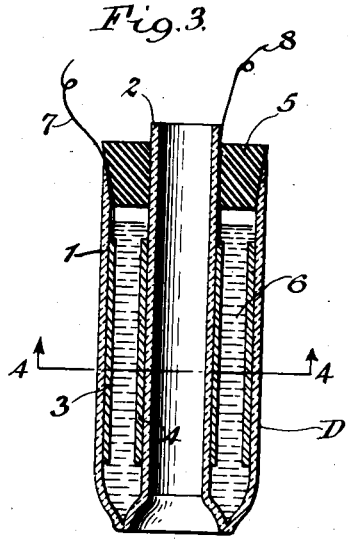
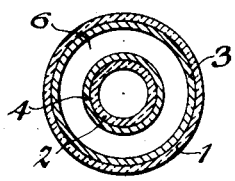
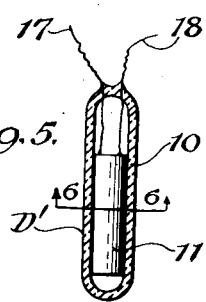
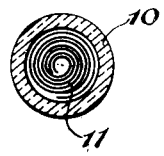
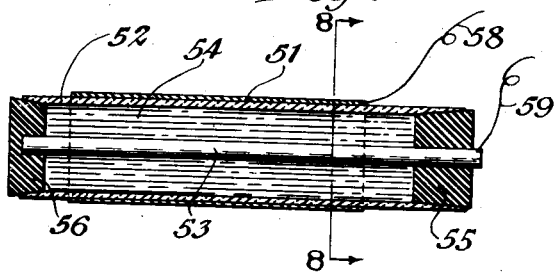
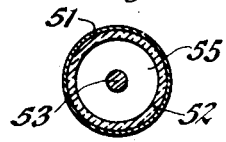
Inventor
Archibald H. Davis Jr.
by Forbes Silsby
Attorney Patented Aug. 20, 1935

2,011,710

UNITED STATES PATENT OFFICE 2,011,710

APPARATUS FOR MEASURING TEMPERATURE

Archibald H. Davis, Jr., Buffalo, N. Y., assignor to National Aniline & Chemical Company, Inc., New York, N. Y., a corporation of New York Application August 18, 1928, Serial No. 300,586

11 Claims. (Cl. 73—32)

This invention relates to the measurement of temperature. It relates particularly to a means for measuring temperature in which the period of oscillation of a high frequency oscillating electrical circuit is made dependent upon the dielectric properties of a substance whose dielectric constant varies with variation in its temperature.

It has been heretofore proposed, in connection with radio communication, to utilize a varying capacity effect to vary the oscillation period of a high frequency oscillating electrical circuit, and to measure the extent of variation in said oscillation period, and consequently the extent of variation in said capacity effect, by bringing to resonance with said oscillating circuit a variable auxiliary circuit whose periods of oscillation are known and controlled. The employment of such means, however, in connection with the measurement of temperature has heretofore been unknown.

The present invention is based upon the discovery that the variation in the dielectric properties of certain substances with a change in their temperature can be utilized to measure temperature by effecting a change in the capacity of an element forming a part of a high frequency oscillating electrical circuit, and accordingly a change in the oscillation frequency of said circuit, which oscillation frequency, and consequently the temperature, can be measured in a suitable manner, e. g. by means of an auxiliary resonating circuit.

The primary object of this invention is to provide simple and effective means for detecting and measuring very small differences in temperature with a high degree of accuracy.

Another object of the invention is to provide means for measuring temperature having a high degree of accuracy over a wide range of temperatures.

Another object of the invention is to provide means for measuring temperature in which the temperature readings are independent of changes in temperature subsequent to the determinations.

Another object of the invention is the provision of a temperature responsive element which is highly sensitive to changes in the temperature of its surroundings, and which has a relatively slight temperature reaction upon the body whose temperature is to be measured.

Another object of the invention is to provide means for detecting and measuring temperatures in which an audible effect is employed.

Other objects of the invention will be apparent from a consideration of the following disclosure which is given for the purpose of illustrating the invention.

In carrying out the invention, a main electrical circuit is caused to oscillate relatively high frequency (for example, radio frequency), and a frequency modifying effect which is a function of the temperature to be measured is caused to modify the period of oscillation of said oscillating electrical circuit and measuring the resulting frequency of oscillation. The resulting frequency of oscillation is measured by resonating with said oscillating electrical circuit a suitable measured auxiliary electrical circuit. The temperature is obtained by reference to the frequency of oscillation of the modified circuit.

The main electrical circuit is caused to oscillate by suitable means, such as, for example, a three element vacuum tube; and the frequency of oscillation of the main circuit is measured by bringing into resonance with said main circuit an auxiliary circuit whose periods of oscillation can be varied and are known. Various circuits can be employed as the auxiliary circuits, such circuits usually comprising one or more variable elements, such as, a capacity or inductance, comprising indicating means which read in terms of capacity or inductance, respectively, or which can be calibrated to read directly in terms of frequency or of temperature. Among such circuits may be mentioned the various types of wave-meter and radio-frequency oscillation generator circuits. The auxiliary circuit can be brought to resonance with the main circuit in any of a number of ways, as will be understood; for example, by adjusting the variable element or elements of the auxiliary circuit until some indicating means shows a condition of resonance to exist. The existence of a state of resonance can be indicated also in any of a number of ways; for example, by means of a glow lamp, a hot-wire ammeter, or similar device, connected to the auxiliary circuit. Or the main and auxiliary circuits can be caused to oscillate and heterodyne, a variable beat oscillation, produced by variation of the oscillation frequency of said auxiliary circuit, can be detected in a suitable detector circuit coupled to said circuits, and the existence of a state of resonance can be determined, upon further proper variation of the oscillation frequency of said auxiliary circuit, by the elimination or absence of the beat oscillation.

In one simple and effective form of apparatus for carrying out the invention, there is incorporated into a suitable portion of a main electrical oscillating circuit (for example, into the grid circuit of a vacuum tube oscillator) a variable condenser whose capacity is dependent upon the temperature to which it is subjected. The said variable condenser is made a part of the main oscillating electrical circuit by connecting it in parallel with a fixed inductance, which is in turn connected, for example, between the grid and the filament of a three element vacuum tube. The main oscillating circuit is coupled, in a suitable manner, to a suitable detector circuit capable of detecting radio-frequencies, and containing a telephone or loud-speaker. For measuring the frequency of the main circuit, and thereby the temperature, there is also coupled to said detector circuit an auxiliary high frequency oscillating electrical circuit, which contains a variable capacity for modifying its frequency. This capacity operates indicating means which can be calibrated in terms of capacity or of frequency of the auxiliary circuit; it is preferably calibrated, however, in terms of temperature.

The temperature responsive variable condenser preferably comprises a pair of plates formed of electrically conducting material, relatively fixed in spaced relation to each other, and having leads for connecting them into an electrical circuit. The plates are preferably metallic, for example, brass or aluminum, and the intervening space between them is occupied by a relatively electrically non-conducting medium whose dielectric constant varies with a variation in its temperature. This medium may be any of a number of gaseous, liquid or solid substances; preferably being one whose dielectric constant is relatively high (specific conductivity is relatively low) and preferably varies greatly with a relatively small change in the temperature of the medium (especially, where a high degree of sensitivity and accuracy of the temperature determination is desired), which is chemically stable under changing temperature conditions, and which is substantially chemically inert with respect to the condenser plates. Among the materials which may be employed as the dielectric medium in said condenser, there may be mentioned, by way of example, methyl aniline, benzyl alcohol, castor oil, acetylenetetrabromide, glycol, chlorhydrin, almond oil, benzol, toluol, aniline, alcohol, paraffin oil, carbon bisulfide, paraffin, mica, varnish, rubber, synthetic resin material of the phenol-formaldehyde type, glass, air, ammonia, ethylene, hydrogen, and nitrogen.

In utilizing this apparatus for measuring temperature, the temperature-responsive condenser is subjected to the temperature to be measured, the main and auxiliary circuits are caused to oscillate, the frequency of the auxiliary circuit is adjusted by suitable adjustment of its variable condenser until an audible beat frequency is produced in the telephone or loud speaker of the detector circuit, and then the two circuits are brought to resonance by further adjusting the variable condenser of the auxiliary circuit until said beat frequency decreases in pitch and finally disappears. The temperature is read directly from the calibrated indicator of the variable condenser of the auxiliary circuit.

An alternative form of temperature-responsive condenser consists of alternate sheets of electrically conducting material and absorbent insulating material all rolled into a spiral and sealed within a tube of electrically non-conducting material. The absorbent material is preferably impregnated with a relatively electrically non-conducting substance whose dielectric constant varies with a change in its temperature. The condenser plates may be any flexible thin metallic material, such as, for example, sheets of copper or lead, tin-foil, etc.; the absorbent insulating material may be, for example, cloth or absorbent paper; the dielectric material may be, for example, any of the dielectrics above mentioned which are suitable for impregnation (castor-oil, paraffin, glycol, toluol, etc.), and the tube containing the condenser may be, for example, glass, synthetic resin material of the phenol-formaldehyde type, ebonite, etc. Leads from said condenser plates provide electrical connections for the condenser.

Another alternative form of temperature-responsive condenser comprises an electrically conducting rod held suspended within a suitable relatively non-conducting casing around the outer wall of which a plate of conducting material is secured, and within which there is contained a suitable temperature-responsive dielectric. Leads from the rod and plate provide means for connection into an electrical circuit. The rod may be of any suitable electrically conducting material, such as, metal, carbon, etc., and is supported from the wall of the casing by suitable legs or supports which may be of either electrically conducting or non-conducting material. The casing is of suitable non-conducting material, such as, glass, synthetic resin material of the phenol-formaldehyde type, etc., and is preferably closed to the atmosphere. The outer plate is preferably of thin metal coated on its outer surface with a protecting and retaining coating of varnish, shellac, or the like; and the temperature-responsive dielectric filling the space between the rod and the inner wall of the casing may be any of the gaseous, liquid, or solid materials above mentioned.

The invention is particularly adapted for the detection and measurement of small differences in temperature with a high degree of accuracy, and for the determination of temperature in a simple and accurate manner.

For a better understanding of the invention, reference should be had to the following description and the accompanying drawings forming a part of this specification, wherein are described and illustrated preferred methods and apparatus for embodying the principles of said invention; but it is to be understood that the invention is not limited thereto, except as indicated in the following claims.

Fig. 1 of the drawings is a diagrammatic representation of one form of apparatus embodying the invention;

Fig. 2 is a diagrammatic representation of an alternative form of the detector circuit forming a part of the apparatus shown in Fig. 1;

Fig. 3 is a sectional elevation of one form of temperature responsive element;

Fig. 4 is a sectional view of said element taken along the line 4—4 of Fig. 3;

Fig. 5 is a sectional elevation of an alternative form of temperature responsive element;

Fig. 6 is a sectional view of said element taken along the line 6—6 of Fig. 5;

Fig. 7 is a sectional elevation of another alternative form of temperature responsive element; and Fig. 8 is a sectional view of said element taken along the line 8—8 of Fig. 7.

The apparatus shown diagrammatically in Fig. 1 comprises a relatively high frequency oscillating electrical circuit A, an auxiliary relatively high frequency oscillating electrical circuit B, and a detector circuit C. Circuit A comprises a suitable fixed reactance I¹, and a variable condenser D (whose capacity changes with a change in its temperature) in parallel with said reactance, forming a part of the grid circuit of a vacuum tube T¹; a reactance P¹, in the plate circuit of T¹ and inductively coupled to reactance I¹, forming a feed-back into said grid circuit for producing oscillation of said circuit; a choke coil I⁴; and suitable "A" and "B" battery connections.

Circuit B is a similar high frequency oscillating electrical circuit consisting of a suitable fixed reactance I², a fixed capacity K², and a variable capacity K¹ having indicating means in connection therewith, said capacities being in parallel with said reactance and with each other, and forming a part of the grid circuit of a vacuum tube T²; a reactance P² in the plate circuit of T² and inductively coupled to reactance I², forming a feed-back into said grid circuit for producing oscillation of said circuit; a choke coil I³; and suitable "A" and "B" battery connections.

Circuit C is a detector circuit for detecting the oscillations produced in the circuits A and B, and consists of a vacuum detector tube T³, whose grid circuit is capacity coupled to the plate circuits of T¹ and T² by condensers K³ and K⁴, respectively; a grid leak G; telephones or loud-speaker L¹; and suitable "A" and "B" battery connections.

R is a resistance for varying the filament voltage of the vacuum tubes T¹, T² and T³.

One form of temperature-responsive element D is shown in Figs. 3 and 4 of the drawings. This consists of two brass or other metallic cylinders 3 and 4 held in spaced relation by concentric electrically non-conducting tubes 1 and 2, cylinder 3 being frictionally held against the inner wall of tube 1, and cylinder 4 being frictionally supported upon the outer wall of tube 2. The two tubes are preferably made of pyrex or similar glass and are held in spaced relation by suitable means, being shown as fused together at their lower ends. The space between the two tubes is filled with castor-oil 6 to such a depth as completely to cover the cylinders 3 and 4. A cork or rubber stopper, sealing wax, or other suitable closure, seals the space 6 from the atmosphere and aids in holding the tubes 1 and 2 in spaced relation. Leads 7 and 8 from cylinders 3 and 4, respectively, provide means for connecting the element D into an electrical circuit, for example, circuit A of Fig. 1. This form of the element D has the advantage that the temperature-responsive dielectric 6 is in the form of a relatively thin film or tube exposed to the temperature influence both on its inner and outer surfaces, so that a very small amount of heat is required in order to affect the capacity of the element and, thereby, the frequency of the main oscillating circuit A.

An alternative form of temperature-responsive condenser, D¹, is shown in Figs. 5 and 6 of the drawings, and comprises a glass tube 10, closed at the bottom and containing a condenser 11 composed of alternate sheets of absorbent paper, which is impregnated with castor-oil, and of tinfoil all rolled into a spiral. The free space in the tube 10 is also filled with castor-oil, and leads 17 and 18, respectively, provide means for connecting the condenser into the circuit A.

A simpler form of temperature-responsive condenser, D², is shown in Figs. 7 and 8 of the drawings. This comprises a metallic rod 53 held within a glass tube 52 by means of rubber stoppers 55 and 56, and forming one plate of the condenser. Around the outer wall of tube 52 is secured a thin sheet of metal 51, such as tin-foil, copper, or brass, forming the other plate of the condenser. The space 54 between the rod 53 and the tube 52 is filled with a suitable temperature-responsive dielectric, for example, castor-oil. Leads 59 and 58, respectively, provide means for connecting the condenser plates 53 and 51 into an electrical circuit, for example, circuit A of Fig. 1.

The operation of the apparatus shown in Fig. 1 is substantially as follows. The circuits A and B are caused to oscillate through the action of vacuum tubes T¹ and T². The high frequency current flowing in circuit A tends to produce a corresponding high frequency current in the detector circuit C, and the high frequency current flowing in circuit B also tends to produce a corresponding high frequency current in detector circuit C. If these currents are of different frequency, a beat, or interference, oscillation will be set up in circuit C; and if these currents are of the same frequency, they will cancel each other, and no oscillation will be set up in circuit C. If the said currents are of slightly different frequency, so that the beat oscillation will be of a frequency lying within the range of audible frequencies, an oscillation will be set up in the detector circuit which will be audible in the telephone or loud-speaker L¹. Variation of the capacity of the temperature-responsive variable condenser D in circuit A will cause a corresponding variation in the frequency of oscillation of said circuit A, and variation of the capacity of variable condenser K¹ in circuit B will cause a corresponding variation in the frequency of oscillation of said circuit B. By holding the capacity of D constant, and varying the capacity of K¹, an audible beat note can be produced in the telephone L¹, and by further proper variation of the capacity of K¹, this beat note can be silenced. As the absence of sound in the telephone L¹ indicates resonance of the two circuits A and B, circuit B measures the frequency of circuit A, and as the frequency of the circuit A is modified or controlled by the capacity of the element D, whose capacity is in turn dependent upon its temperature, the oscillation frequency of the auxiliary circuit B measures the temperature of element D. Tables or curves can accordingly be prepared correlating temperature with the frequency of circuit B, or, since circuit B contains only the variable K¹, with the capacity of K¹.

For the purpose of temperature measurement, the exact frequency of circuits A and B, or the capacity of element D and condenser K¹ need not be known; it is merely necessary that the indicating means connected with variable condenser K¹ be calibrated in terms of the temperature to which element D is exposed. In calibrating said condenser K¹ for a particular element D, said element D is subjected to a known temperature while causing circuits A and B to oscillate, and condenser K¹ is adjusted until the absence of sound in telephone L¹ indicates a condition of resonance to exist. The dial or other indicator of condenser K¹ is then marked to correspond with the temperature to which the condenser D is subjected. The dial or indicator of condenser K¹ is then calibrated for other temperatures in a similar manner. If desired, still other temperature calibrations can be calculated.

It will be apparent that the device need not be calibrated by reference to known temperatures, but that the variable condenser $K^1$ can be calibrated mathematically. It will, of course, be understood that the circuit B will be chosen to have such frequency of oscillation as will approximate the frequency of oscillation of circuit A, so that the point of resonance will fall within the operative range of condenser $K^1$. This result can readily be obtained by the employment of a capacity $K^2$ of proper size. Furthermore, instead of operating upon its fundamental frequency, either circuit can be operated upon a harmonic frequency.

In using the device for measuring temperature, the circuits A and B are caused to oscillate, the element D is subjected to the temperature to be measured, condenser $K^1$ is varied until an audible beat oscillation is heard in $L^1$, then it is further varied until the beat oscillation decreases in pitch and finally disappears, and the temperature reading is obtained from the indicator of condenser $K^1$. It will be noted that the determination of temperature by means of this device makes use of an audible effect, and that the temperature reading does not change with a change in the temperature subsequent to a determination, and accordingly need not be taken at the time of determination; so that a temperature determination of a high degree of accuracy can be made by an operator, by means of the auditory sense, while taking readings of other instruments by means of the optical sense, and the temperature reading corresponding to the temperature determination can be taken subsequently.

The instrument can be made very highly sensitive to temperature change by making the operating frequencies of circuits A and B relatively high (preferably by having reactances $I^1$ and $I^2$ relatively small), and by having fixed condenser $K^2$ of high capacity relative to variable condenser $K^1$ so that a small change in the temperature of element D will cause a relatively large change in the capacity of condenser $K^1$.

In addition, for extreme accuracy, the condensers $K^1$ and $K^2$ are contained in a constant temperature bath; although ordinarily such precaution is not necessary, particularly where the dielectric of condenser D has a relatively high temperature coefficient.

Inasmuch as the sensitivity of the device increases with a decrease in the range of temperatures covered by condenser $K^1$, the temperature range of a particular sensitive instrument will be relatively small. In order to overcome this difficulty and provide an instrument operating over a wide range of temperatures with the same degree of accuracy throughout, a series of removable fixed condensers $K^2$ can be employed, the capacity of each of which varies from that of the next member of the series by a capacity slightly less than that of condenser $K^1$. Then by inserting in circuit B the condenser $K^2$ which corresponds with the temperature to be measured, the instrument can be made responsive to any desired temperature with a high degree of accuracy.

In the device shown in Fig. 1, a condition of resonance between circuits A and B is determined by means of telephone or loud speaker $L^1$, and it will be apparent that, if desired, any suitable type of audio-frequency amplification can be employed in connection with the detector circuit C, without changing the nature or scope of the invention. Moreover, other means for indicating resonance of said circuits may be used, and an alternative means is diagrammatically illustrated in Fig. 2 of the drawings.

In this figure, $C^1$ represents a detector circuit, similar to circuit C of Fig. 1, and capacity coupled to circuits A and B by means of condenser $K^3$ and $K^4$, respectively. Instead of the telephone $L^1$ of Fig. 1, the primary M of a suitable transformer, bridged by a suitable low capacity condenser $K^5$, is connected in the plate circuit of detector tube $T^3$. The secondary N of said transformer is connected in circuit with an incandescent lamp $L^2$ and/or an alternating current voltmeter V by means of switches $S^1$ and $S^2$.

In the operation of the device containing this alternative indicating means, the circuits A and B are caused to oscillate as above, and the beat oscillation produced in circuit $C^1$ causes an alternating voltage to be built up in the circuit of the secondary N. If the lamp $L^2$ is connected in the circuit, it will glow, or if the voltmeter V is connected in the circuit, it will register. When a condition of resonance between circuits A and B is obtained upon adjustment of condenser $K^1$, however, the lamp will be extinguished or the voltmeter will not register. In order to ascertain that the circuits A and B have not been thrown so far out of resonance that the resulting beat oscillation in circuit $C^1$ is of too high a frequency to affect the transformer secondary N, suitable additional variation of the condenser $K^1$ past the apparent point of resonance must be made. If the point found is the point of resonance, the lamp or voltmeter will respond upon slight variation of the capacity of condenser $K^1$ to either side of the point of resonance, otherwise not.

It will be evident that the circuit $C^1$ need not have both a voltmeter and lamp in its secondary circuit, but may have either alone. The use of both is preferred, however, since approximate adjustment can be made by means of the lamp, and final adjustment by means of the voltmeter, which is more sensitive than the lamp.

As pointed out above, the invention is not limited to the specific embodiments above described and illustrated in the accompanying drawings, but is capable of wide variation within the scope of the appended claims.

Thus, for example, the main oscillating circuit A is not restricted to the type of circuit shown in Fig. 1, but any suitable type of high frequency oscillating electrical circuit, capable of having its frequency modified by a variable condenser, can be employed. If desired the main oscillating circuit may also contain a suitable fixed condenser $K^6$, shown in dotted lines in Fig. 1, in order to reduce the capacity effect of the element D, but this is not preferable, since it reduces the sensitivity of the device.

The temperature-responsive condenser D is not restricted to the forms and constructions above described, but may be any suitable condenser whose capacity changes with a change in its temperature. Thus, for example, it may take the form of a condenser in which the conducting plates are spaced by a suitable supporting material whose dielectric properties vary with a change in its temperature; but for great accuracy a condenser of the form above described, and especially that illustrated in Figs. 3 and 4 of the drawings, is preferred. It will also be evident that the element D, instead of comprising a pair of electrically conducting members, as shown in the drawings, may comprise sets of conducting members connected in parallel.

The oscillation frequency of the main circuit may be measured in any suitable manner, as above pointed out, and the temperature may be determined in terms of capacity, inductance, or frequency, if desired, or directly in terms of temperature, as described.

It will furthermore be apparent that the invention is not limited solely to the measurement of temperature, but that it can be used to indicate a deviation from a desired constant temperature; for example, by adjusting the circuits A and B of Fig. 1 of the drawings, through suitable adjustment of condenser K¹, to a condition of resonance corresponding with the desired constant temperature, a deviation from the constant temperature will cause an audible signal to be produced in the loud-speaker L¹.

I claim:

1. An apparatus for measuring temperature, comprising in combination a main high frequency oscillating electrical circuit, means for modifying the oscillation frequency of said circuit comprising a condenser whose capacity varies with a variation in its temperature, an auxiliary high frequency oscillating electrical circuit, and means for resonating said auxiliary circuit with said main circuit, said resonating means comprising means adapted to vary the frequency of oscillation of said auxiliary circuit and calibrated to indicate temperature.

2. An apparatus for measuring temperature, comprising in combination a main high frequency oscillating electrical circuit, means for modifying the oscillation frequency of said circuit comprising a condenser whose capacity varies with a variation in its temperature, an auxiliary high frequency oscillating electrical circuit, means for varying the frequency of oscillation of said auxiliary circuit and calibrated to indicate the temperature of said condenser, and means for determining resonance between said circuits.

3. An apparatus for measuring temperature, comprising in combination a main high frequency oscillating electrical circuit, a condenser connected to said circuit, the capacity of which condenser varies with a variation in its temperature, an auxiliary high frequency oscillating electrical circuit, means for varying the frequency of oscillation of said auxiliary circuit and calibrated to indicate the temperature of said condenser, and means including an audible element for determining resonance between said circuits.

4. An apparatus for indicating temperature changes, comprising in combination a main high frequency oscillating electrical circuit, means for modifying the oscillation frequency of said circuit comprising a condenser whose capacity varies with a variation in its temperature, an auxiliary high frequency oscillating electrical circuit, a variable condenser in said auxiliary circuit, a variable condenser in said auxiliary circuit calibrated to indicate temperature changes of said frequency modifying condenser, and means for determining resonance between said circuits.

5. An apparatus for measuring temperature, comprising in combination a main high frequency oscillating electrical circuit, a condenser connected to said circuit, the capacity of which condenser varies with a variation in its temperature, an auxiliary high frequency oscillating electrical circuit, means for varying the frequency of oscillation of said auxiliary circuit and calibrated to indicate the temperature of said condenser, and a detector circuit connected to said main and auxiliary circuits for determining resonance between said circuits.

6. An apparatus for measuring temperature, comprising in combination a main high frequency oscillating electrical circuit, a condenser connected to said circuit, the capacity of which condenser varies with a variation in its temperature, an auxiliary high frequency oscillating electrical circuit, means for varying the frequency of oscillation of said auxiliary circuit and calibrated to indicate the temperature of said condenser, and a detector circuit connected to said circuits and containing audible means whereby resonance between said main and auxiliary circuits can be determined.

7. An apparatus for measuring temperature, comprising in combination a main high frequency oscillating electrical circuit, a condenser connected to said circuit, the capacity of which condenser varies with a variation in its temperature, an auxiliary high frequency oscillating electrical circuit, a variable condenser in said auxiliary circuit calibrated to indicate temperature, and a detector circuit connected to said main and auxiliary circuits for determining resonance between said circuits.

8. An apparatus for indicating temperature changes, comprising in combination a main high frequency oscillating electrical circuit, means for modifying the oscillation frequency of said circuit, said means including a temperature responsive element comprising a condenser having as its dielectric a material whose dielectric properties vary greatly with a small variation in its temperature, and means associated with said oscillating circuit for indicating temperature changes of said temperature responsive element.

9. In an apparatus for measuring temperature, a temperature responsive element including a condenser comprising a tubular-shaped vessel having a central opening therethrough, spaced tubular condenser plates within said vessel, and a dielectric between said condenser plates, the dielectric properties of which dielectric change with a change in temperature.

10. In an apparatus for measuring temperature, a temperature responsive element including a condenser comprising two concentric tubes joined together at one end to form a tubular chamber, tubular condenser plates within said chamber, and a liquid in said chamber, the dielectric properties of which liquid change with a change in temperature.

11. An apparatus for indicating temperature changes, comprising in combination a main high frequency oscillating electrical circuit, means for modifying the oscillation frequency of said circuit comprising a condenser whose capacity varies with a variation in its temperature, and means associated with said oscillating circuit for indicating temperature changes of said condenser.

ARCHIBALD H. DAVIS, Jr.